(12) United States Patent
Yamamoto et al.

(10) Patent No.: US 11,231,105 B2
(45) Date of Patent: Jan. 25, 2022

(54) AUTOMATIC TRANSMISSION

(71) Applicant: TOYOTA JIDOSHA KABUSHIKI KAISHA, Toyota (JP)

(72) Inventors: Kozo Yamamoto, Nagoya (JP); Keisuke Ninomiya, Susono (JP); Hironori Asaoka, Numazu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 159 days.

(21) Appl. No.: 16/546,431

(22) Filed: Aug. 21, 2019

(65) Prior Publication Data

US 2020/0072341 A1    Mar. 5, 2020

(30) Foreign Application Priority Data

Aug. 31, 2018    (JP) .............................. JP2018-163879

(51) Int. Cl.
| | |
|---|---|
| *F16D 55/36* | (2006.01) |
| *F16H 57/10* | (2006.01) |
| *F16D 55/40* | (2006.01) |
| *F16D 65/853* | (2006.01) |
| *B60T 1/06* | (2006.01) |

(Continued)

(52) U.S. Cl.
CPC .............. *F16H 57/10* (2013.01); *B60T 1/062* (2013.01); *B60T 1/065* (2013.01); *F16D 55/40* (2013.01); *F16D 65/853* (2013.01); *F16D 2121/04* (2013.01); *F16D 2125/06* (2013.01); *F16H 3/44* (2013.01); *F16H 2200/0008* (2013.01); *F16H 2200/201* (2013.01)

(58) Field of Classification Search
CPC .......... B60T 1/062; B60T 1/065; F16H 57/10; F16H 57/0409; F16H 57/0473; F16H 57/0424; F16H 63/3026; F16D 65/853; F16D 55/24; F16D 55/36; F16D 55/40; F16D 55/44
See application file for complete search history.

(56) References Cited

U.S. PATENT DOCUMENTS

| | | | | |
|---|---|---|---|---|
| 5,630,492 | A * | 5/1997 | Yoshikawa | ......... F16D 25/0638 192/106 F |
| 2007/0082778 | A1* | 4/2007 | Yamamura | ......... F16H 57/0482 475/317 |

(Continued)

FOREIGN PATENT DOCUMENTS

| | | |
|---|---|---|
| JP | H05-052369 U | 7/1993 |
| JP | 2007-113683 A | 5/2007 |

(Continued)

*Primary Examiner* — Nicholas J Lane
(74) *Attorney, Agent, or Firm* — Oliff PLC

(57) ABSTRACT

An automatic transmission includes: a frictional engagement element including first and second annular friction plates; a pressing member moving in the axial direction relative to the transmission case and press the frictional engagement element in the axial direction; and a lubricating oil. Further, the transmission case includes a contact portion on the inner wall so that the contact portion is separated from a back surface of the pressing member when the frictional engagement element is in an engagement state and comes into contact with the back surface of the pressing member when the frictional engagement element is in a disengagement state.

2 Claims, 7 Drawing Sheets

(51) Int. Cl.
  *F16D 125/06* (2012.01)
  *F16D 121/04* (2012.01)
  *F16H 3/44* (2006.01)

(56) References Cited

U.S. PATENT DOCUMENTS

2007/0256294 A1* 11/2007 Onishi ................ F16H 63/3026
  29/700
2019/0178377 A1  6/2019 Terada et al.

FOREIGN PATENT DOCUMENTS

JP  2013-200012 A  10/2013
WO  2018/043092 A1  3/2018

\* cited by examiner

FIG.3

| SHIFT POSITION | C1 | C2 | C3 | C4 | B1 | B2 |
|---|---|---|---|---|---|---|
| 1st | ○ | | | | | ○ |
| 2nd | ○ | | | | ○ | |
| 3rd | ○ | | ○ | | | |
| 4th | ○ | | | ○ | | |
| 5th | ○ | ○ | | | | |
| 6th | | ○ | | ○ | | |
| 7th | | ○ | ○ | | | |
| 8th | | ○ | | | ○ | |
| Rev1 | | | ○ | | | ○ |
| Rev2 | | | | ○ | | ○ |

DIRECTION OF ROTATION CENTER RC

DIRECTION OF ROTATION CENTER RC

AUTOMATIC TRANSMISSION

CROSS-REFERENCE TO RELATED APPLICATION(S)

The present application claims priority to and incorporates by reference the entire contents of Japanese Patent Application No. 2018-163879 filed in Japan on Aug. 31, 2018.

BACKGROUND

The present disclosure relates to an automatic transmission.

International Publication No. WO 2018/043092 discloses an automatic transmission provided with a multiple disc brake, which is a frictional engagement element including a plurality of first annular friction plates and a plurality of second annular friction plates which are alternately superposed on one another in the axial direction. The first friction plates are engaged with spline teeth formed on an inner wall of a transmission case, and the second friction plates are engaged with spline teeth formed on an outer peripheral surface of a rotating member. In this automatic transmission, the transmission case includes the multiple disc brake, a piston, and a lubricant. The piston is a pressing member used for pressing the multiple disc brake in the axial direction to engage the first friction plates and the second friction plates by friction. The lubricant lubricates the multiple disc brake.

SUMMARY

There is a need for providing an automatic transmission that enables a reduction of lubricating oil to be supplied to a frictional engagement element along an inner wall of a transmission case.

According to an embodiment, an automatic transmission includes: a transmission case; a rotating member; a frictional engagement element which includes a plurality of first annular friction plates, which are formed in an annular shape and are engaged with first spline teeth formed on an inner wall of the transmission case and a plurality of second annular friction plates, which are formed in an annular shape and are engaged with second spline teeth formed on an outer peripheral surface of the rotating member, the first friction plates and the second friction plate being alternately superposed on one another in an axial direction of the rotating member; a pressing member moving back and forth in the axial direction relative to the transmission case and press the frictional engagement element in the axial direction; and a lubricating oil which lubricates the frictional engagement element. Further, the frictional engagement element, the pressing member, and the lubricating oil are housed in the transmission case, the frictional engagement element is in an engagement state when the pressing member presses the frictional engagement element and the frictional engagement element is in a disengagement state when the pressing by the pressing member to the frictional engagement element is released, and the transmission case includes a contact portion on the inner wall so that the contact portion is separated from a back surface of the pressing member when the frictional engagement element is in the engagement state and comes into contact with the back surface of the pressing member when the frictional engagement element is in the disengagement state.

BRIEF DESCRIPTION OF THE DRAWINGS

FIG. 3 is an engagement table indicating working states of clutches and brakes when a drive position is selected;

DETAILED DESCRIPTION

In the automatic transmission disclosed in International Publication No. WO 2018/043092, the multiple disc brake is arranged close to the inner wall of the transmission case. This arrangement may cause a large quantity of lubricating oil to be supplied to the multiple disc brake along the inner wall of the transmission case and may increase a drag loss when the multiple disc brake is disengaged.

An automatic transmission according to an embodiment of the present disclosure will now be described. It should be noted that the present disclosure is not limited to this embodiment.

Figure 1:
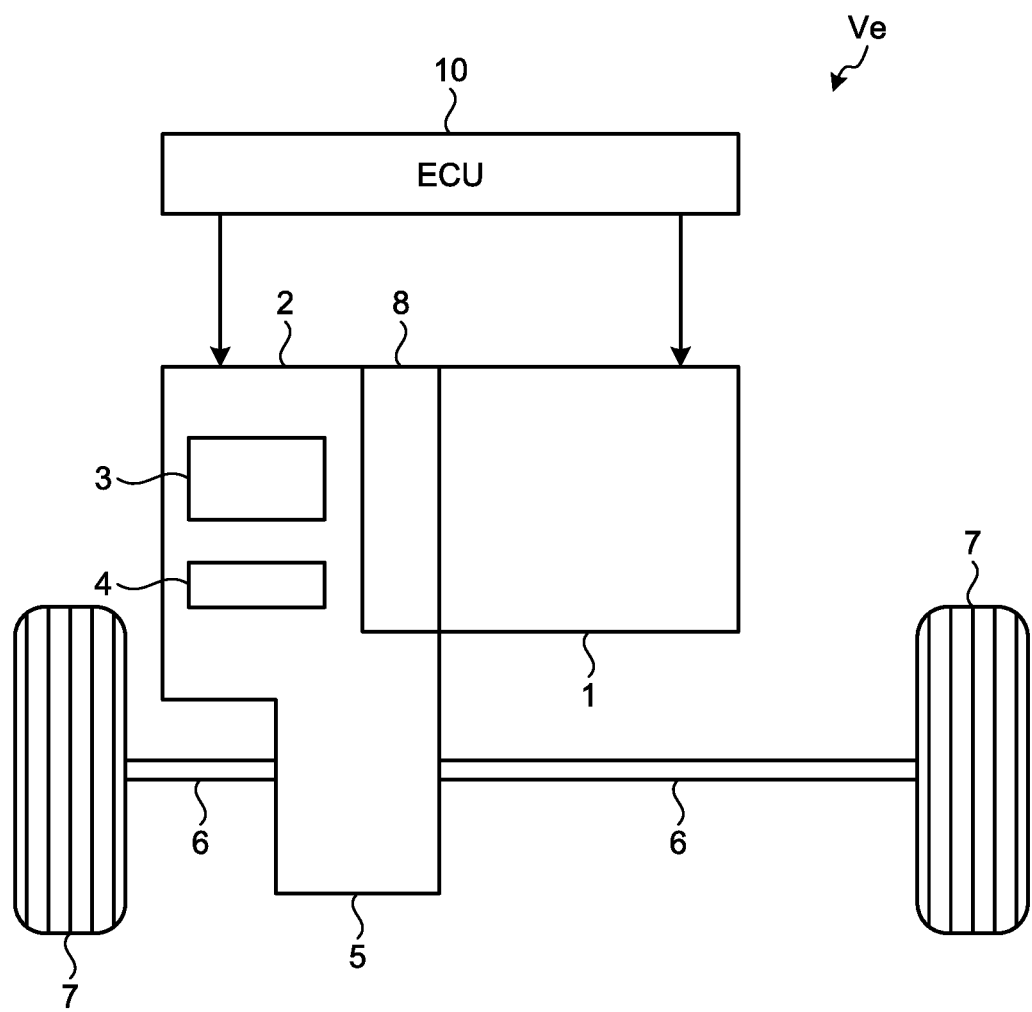
FIG. 1 is a schematic view illustrating a power train in a vehicle according to an embodiment.

First, an example configuration of a vehicle including an automatic transmission according to an embodiment of the present disclosure is described. FIG. 1 is a schematic view illustrating an example configuration of a power train in a vehicle according to an embodiment. A vehicle Ve according to an embodiment is, for example a Front engine Front drive (FF) vehicle having a step-variable automatic transmission. The vehicle Ve may be other than the FF vehicle.

The power train of the vehicle Ve includes an engine 1, an automatic transmission 2, a planetary gear unit 3, a hydraulic control circuit 4, a differential gear 5, a drive shaft 6, wheels 7, and an Electronic Control Unit (ECU) 10. Each of the planetary gear unit 3 and the hydraulic control circuit 4 constitute a part of the automatic transmission 2. The engine 1 and the automatic transmission 2 are connected through a torque converter 8.

The engine 1 is a power unit that burns a fuel and outputs a power. As the engine 1, for example, an internal-combustion engine such as a gasoline engine, a diesel engine, an LPG engine or the like may be used. A fuel combustion pushes down a piston inside a cylinder and causes a rotation of a crankshaft. Selection of a desired gear position enables the automatic transmission 2 to convert a rotational speed of the crankshaft into a desired rotational speed. An output gear of the automatic transmission 2 meshes with the differential gear 5. The drive shaft 6 is connected to the differential gear 5 by, for example, spline fitting. An output power of the engine 1 is transmitted to the right and left wheels 7 via the drive shaft 6.

To the ECU 10 serving as a control unit, various kinds of sensors (none of them are illustrated) are connected via a harness or the like. Based on a signal supplied from each sensor and a map and a program stored in a Read Only Memory (ROM), the ECU 10 controls equipment such as the engine 1 and the automatic transmission 2 so that the vehicle Ve is in a desired state. The automatic transmission 2 is a step-variable transmission that enables a discontinuous and stepwise change of a ratio between an input rotational frequency and an output rotational frequency, that is, a gear ratio. The ECU 10 controls the automatic transmission 2 to form (select) one of the first to eighth gear positions (gear ratio) while the vehicle Ve is running. The formation (selection) of one of the first to eighth gear positions enables the automatic transmission 2 to transmit a drive force to the wheels 7. It should be noted that gear positions are not limited to the first to eighth gears.

Figure 2:
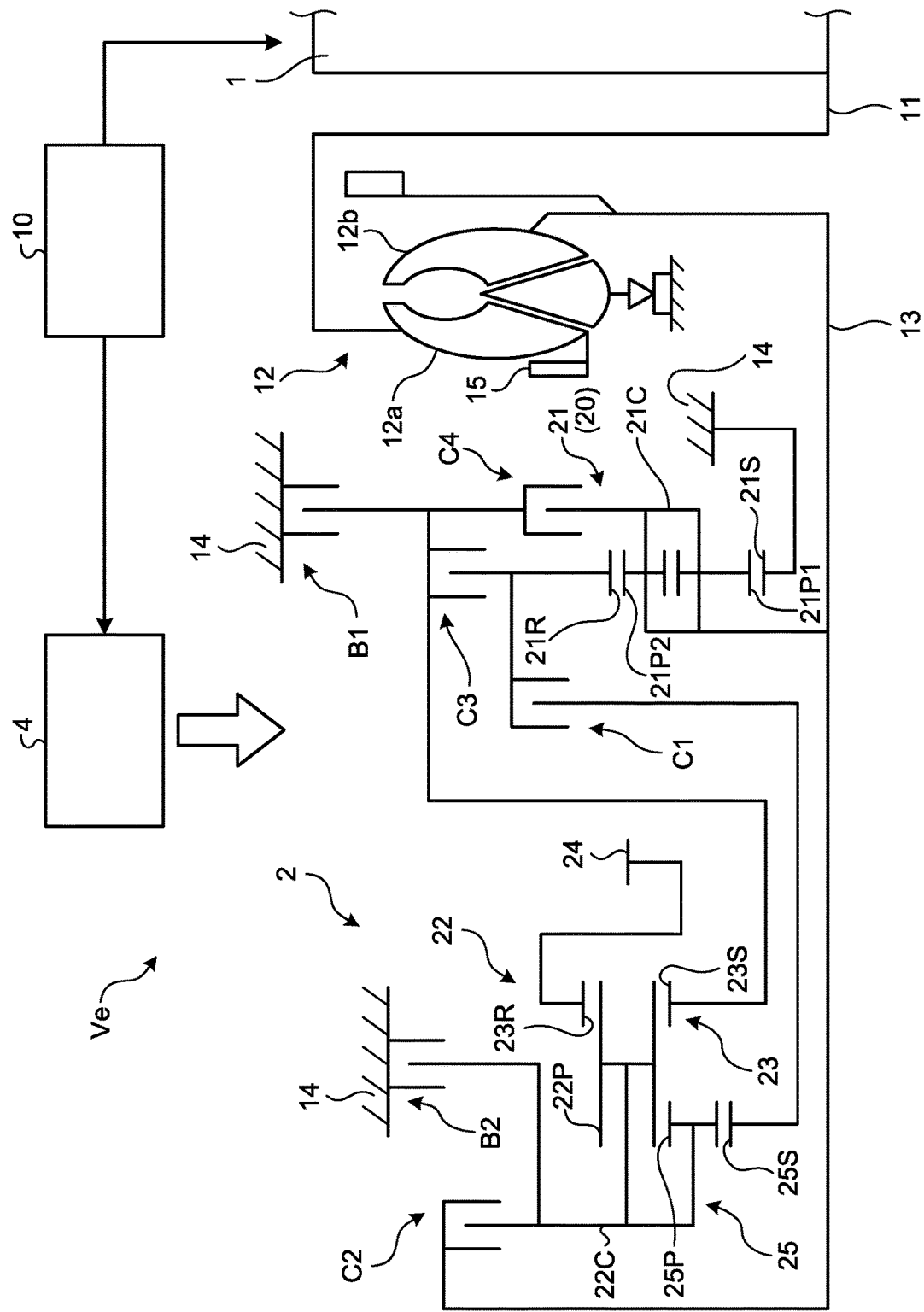
FIG. 2 is a skeleton diagram illustrating a configuration of the vehicle according to the embodiment.

FIG. 2 is a skeleton diagram of the arrangement of the vehicle Ve according to an embodiment. As illustrated in FIG. 2, in the engine 1, a thermal energy generated by the fuel combustion is converted into a rotational motion of a crankshaft 11. The engine 1 is provided with a torque converter 12 that enables the transmission of power to the crankshaft 11. The torque converter 12 is a device that enables power transmission by a kinetic energy of fluid.

The torque converter 12 includes a pump impeller 12a and a turbine runner 12b. To the pump impeller 12a, a mechanical oil pump 15 that generates a hydraulic pressure is connected. The oil pump 15 controls gear shifts of the automatic transmission 2 and supplies a lubricating oil to each unit of a power transmission line in the automatic transmission 2.

An input shaft 13 is arranged coaxially with the crankshaft 11. The automatic transmission 2 is disposed in the power transmission line from the crankshaft 11 to the wheels 7. The automatic transmission 2 is disposed inside a casing 14 or a hollow transmission case. The automatic transmission 2 according to an embodiment includes a first gearshift unit 20 provided with a first planetary gear mechanism 21 and a second gearshift unit 22 provided with a second planetary gear mechanism 23 and a third planetary gear mechanism 25.

The first gearshift unit 20 is an auxiliary gearshift unit, including the first planetary gear mechanism 21 of a double pinion type. The first planetary gear mechanism 21 includes a first sun gear 21S as external teeth, a first ring gear 21R as internal teeth, pinion gears 21P1 and 21P2, and a carrier 21C. The first sun gear 21S and the first ring gear 21R are arranged coaxially. The pinion gear 21P1 meshes with the first sun gear 21S and the pinion gear 21P2. The pinion gear 21P2 meshes with the first ring gear 21R and the pinion gear 21P1. The carrier 21C supports two types of pinion gears 21P1 and 21P2 such that the pinion gears 21P1 and 21P2 rotate independently and revolve in an integrated manner. The first planetary gear mechanism 21 includes three rotational elements, that is, the first sun gear 21S, the first ring gear 21R, and the carrier 21C. Those rotational elements are connected to each other in a differentially rotatable manner. The first sun gear 21S is fixed to the casing 14 so as not to rotate.

The second gearshift unit 22 is arranged on the outer periphery side of the input shaft 13. The second gearshift unit 22 is a primary gearshift unit, including a plurality of sets of planetary gear mechanisms. The second planetary gear mechanism 23 is a part of the second gearshift unit 22, including a second sun gear 23S, a second ring gear 23R, a long pinion gear 22P, and a carrier 22C. The second sun gear 23S and the second ring gear 23R are arranged coaxially. The long pinion gear 22P meshes with the second sun gear 23S and the second ring gear 23R. The carrier 22C supports the long pinion gear 22P such that the long pinion gear 22P rotates and revolves. The second planetary gear mechanism 23 includes three rotational elements, that is, the second sun gear 23S, the second ring gear 23R, and the carrier 22C. Those rotational elements are connected to each other in a differentially rotatable manner. The second planetary gear mechanism 23 is provided with an output gear 24 that rotates with the second ring gear 23R in an integrated manner. The wheels 7 are connected to the output gear 24 so as to transmit power.

The third planetary gear mechanism 25 is a part of the second gearshift unit 22, including a third sun gear 25S, a short pinion gear 25P, and the carrier 22C. The third sun gear 25S is arranged coaxially with the second sun gear 23S and the number of teeth of the third sun gear 25S is smaller than that of the second sun gear 23S. The short pinion gear 25P meshes with the third sun gear 25S and the long pinion gear 22P. The carrier 22C supports the long pinion gear 22P and the short pinion gear 25P such that the long pinion gear 22P and the short pinion gear 25P rotate independently and revolve in an integrated manner. In other words, the carrier 22C of the second gearshift unit 22 is shared in the second planetary gear mechanism 23 and the third planetary gear mechanism 25. The second gearshift unit 22 is a planetary gear mechanism of the Ravigneaux type, including the second planetary gear mechanism 23 and the third planetary gear mechanism 25.

Hereinafter described are clutches and brakes. The clutches herein serve as engagement elements that enable mutual connection or disengagement of the rotational elements included in the first planetary gear mechanism 21, the second planetary gear mechanism 23, and the third planetary gear mechanism 25. The brakes herein serve as an engagement element that selectively stops or fixes the rotational elements. In regard to the clutches, there is provided a first clutch C1, a second clutch C2, a third clutch C3, and a fourth clutch C4. In regard to the brakes, there is provided a first brake B1 and a second brake B2.

The first clutch C1 selectively connects (engages) or disengages the first ring gear 21R and the third sun gear 25S. The second clutch C2 selectively connects or disengages the carrier 22C and the input shaft 13. The third clutch C3 selectively connects or disengages the first ring gear 21R and the second sun gear 23S. The fourth clutch C4 selectively connects or disengages the carrier 21C and the second sun gear 23S. The first brake B1 stops the second sun gear 23S. The second brake B2 stops the carrier 22C.

The first clutch C1 to the fourth clutch C4, and the first brake B1 and the second brake B2 (hereinafter simply referred to as the clutches C and the brakes B or as the engagement devices unless otherwise specified) are hydraulic frictional engagement devices. The clutches C and the brakes B are, for example, wet multiple disc clutches and wet multiple disc brakes, respectively, pressed by a hydraulic actuator. The hydraulic control circuit 4 changes a torque capacity (that is, an engagement force) of such clutches C and brakes B so as to switch states between engagement and disengagement.

The hydraulic control circuit 4 is disposed herein as an actuator for separately controlling hydraulic pressure acting on the wet multiple disc clutches and the wet multiple disc brakes. The hydraulic control circuit 4 is a known circuit that includes, for example, an oil passage, a pressure control valve, and an oil passage switching valve.

A working of a shift position selection device (not illustrated) disposed in the interior of the vehicle Ve enables selection of a position from the Parking (P) position, the Reverse (R) position, the Neutral (N) position, and the Drive (D) position. When a shift position is switched from one to another, the first clutch C1 to the fourth clutch C4 and the first brake B1 and the second brake B2 are controlled to be engaged or disengaged, respectively. When the Parking (P) position or the Neutral (N) position is selected, the brakes B and the clutches C are all disengaged, which interrupts the power transmission between the input shaft 13 and the output gear 24. The Parking (P) position and the Neutral (N) position are non-driving positions.

On the other hand, when the Drive (D) position or the Reverse (R) position is selected, the input shaft 13 and the output gear 24 are connected so as to transmit the power. The Drive (D) position and the Reverse (R) position are drive positions. The ECU 10 stores a gearshift map to control the shift positions of the automatic transmission 2. At the Drive (D) position, the ECU 10 selects a shift position of the automatic transmission 2 based on the gearshift map and switches the shift position to another. This gearshift map defines areas for selecting each of the shift positions, using a vehicle speed and an accelerator position as parameters. Specifically, the gearshift map defines areas for selecting the first gear (1st), the second gear (2nd), the third gear (3rd), the fourth gear (4th), the fifth gear (5th), the sixth gear (6th), the seventh gear (7th), the eighth gear (8th), the first reverse position (Rev1), and the second reverse position (Rev2) as shift positions of the automatic transmission 2. Using the gearshift map, the automatic transmission 2 performs upshifts and downshifts.

FIG. 3 is a table illustrating the working states of the clutches C and the brakes B when a drive position is selected. In FIG. 3, the symbol "o" indicates that the clutches C or the brakes B are engaged. In this embodiment, hydraulic chambers (not illustrated in FIG. 2) are disposed for the clutches C and the brakes B, respectively. The hydraulic pressure of oil supplied to each hydraulic chamber is controlled, and then the clutches C and the brakes B are separately engaged or disengaged. For example, in FIG. 3, when the first gear is selected, the first clutch C1 and the second brake B2 are engaged. The clutches C and the brakes B other than those being engaged are disengaged.

Figure 4:
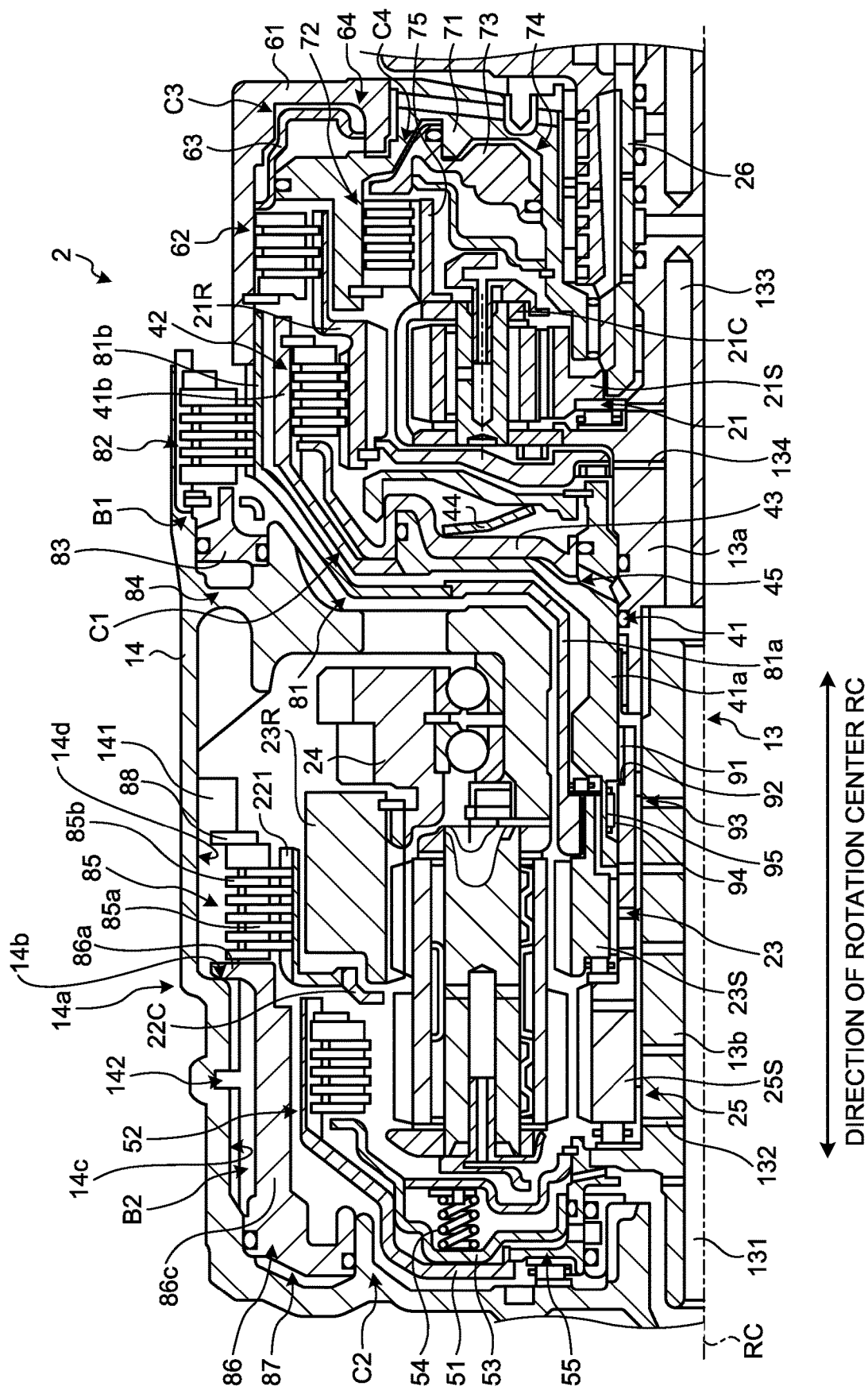
FIG. 4 is a cross-sectional view illustrating a main part of the automatic transmission.

FIG. 4 is a cross-sectional view illustrating a main part of the automatic transmission 2. In the casing 14 as the transmission case which is a non-rotating member, the automatic transmission 2 houses the input shaft 13, the output gear 24, the first planetary gear mechanism 21, the second planetary gear mechanism 23, and the third planetary gear mechanism 25, the first clutch C1 to the fourth clutch C4, the first brake B1, and the second brake B2. The input shaft 13, the first planetary gear mechanism 21 to the third planetary gear mechanism 25, the first clutch C1 to the fourth clutch C4, and the first brake B1 and the second brake B2 are arranged in a substantially symmetric manner with respect to a predetermined rotation center RC. Accordingly, the lower half from the rotation center RC is omitted in FIG. 4.

The input shaft 13 is arranged about the rotation center RC in a rotatable manner. The input shaft 13 includes a first rotary shaft 13a and a second rotary shaft 13b. The first rotary shaft 13a is arranged on the side close to the torque converter 12 in an axial direction RC. The second rotary shaft 13b has one end in the axial direction RC being spline-fitted in the first rotary shaft 13a so as to rotate with the first rotary shaft 13a in an integrated manner. On the side close to the torque converter 12 in the axial direction RC, an end of the first rotary shaft 13a is connected to the turbine runner 12b of the torque converter 12 so as to transmit the power.

Inside a hallow portion of the second rotary shaft 13b of the input shaft 13, there is formed an oil passage 131 extended in the axial direction RC from the rear end opposite to the torque converter 12 in the axial direction RC. A lubricating oil is supplied to the oil passage 131 from the hydraulic control circuit 4 through the oil passage on the rear end. Furthermore, the second rotary shaft 13b is provided with a plurality of through holes 132 communicating the oil passage 131 with the outside of the second rotary shaft 13b in a radial direction of the second rotary shaft 13b. Accordingly, the lubricating oil in the oil passage 131 is discharged to the outside of the second rotary shaft 13b through the through holes 132 by a centrifugal force generated by the rotation of the input shaft 13. The lubricating oil discharged to the outside of the second rotary shaft 13b through the through holes 132 is supplied by the centrifugal forces of, for example, the second planetary gear mechanism 23, the third planetary gear mechanism 25, the second clutch C2, and the second brake B2 arranged outside the second rotary shaft 13b in the radial direction.

Furthermore, an oil passage 133 extended in the axial direction RC is formed inside a hollow portion of the first rotary shaft 13a. The oil passage 133 communicates with the oil passage 131 of the second rotary shaft 13b. The first rotary shaft 13a is provided with a plurality of through holes 134 communicating the oil passage 133 with the outside of the first rotary shaft 13a in a radial direction of the first rotary shaft 13a. Accordingly, the lubricating oil in the oil passage 133 is discharged to the outside of the first rotary shaft 13a through the through holes 134 by a centrifugal force generated by the rotation of the input shaft 13. The lubricating oil discharged to the outside of the first rotary shaft 13a through the through holes 134 is supplied by centrifugal forces of, for example, the first planetary gear mechanism 21, the first clutch C1, the third clutch C3, the fourth clutch C4, and the first brake B1 arranged outside the first rotary shaft 13a in the radial direction.

The first planetary gear mechanism 21, the output gear 24, the second planetary gear mechanism 23, and the third planetary gear mechanism 25 are arranged in order from the torque converter 12 in the axial direction RC.

The first planetary gear mechanism 21 is of double pinion type. The first sun gear 21S of the first planetary gear mechanism 21 is connected to an intermediate member 26 arranged on the outer periphery of the first rotary shaft 13a. The intermediate member 26 is connected to the casing 14 which is a non-rotating member. Accordingly, the first sun gear 21S is held in a non-rotatable manner. The carrier 21C is connected to the fourth clutch C4. The first ring gear 21R is formed in an annular shape. A multiple disc clutch 42 of the first clutch C1 and a multiple disc clutch 62 of the third clutch C3 are disposed on an outer periphery part of the first ring gear 21R.

The second sun gear 23S of the second planetary gear mechanism 23 is fitted by a spline in an end of a small-diameter portion 81a formed in a cylindrical connection drum 81. The third sun gear 25S of the third planetary gear mechanism 25 has a substantially cylindrical shape. On the side close to the torque converter 12 in the axial direction RC, an end of the third sun gear 25S is fitted by a spline in a small-diameter portion 41a of a clutch drum 41.

The carrier 22C shared by the second planetary gear mechanism 23 and the third planetary gear mechanism 25 supports the long pinion gear 22P and the short pinion gear 25P in a rotatable and revolvable manner. A multiple disc clutch 52 of the second clutch C2 and a multiple disc brake 85 of the second brake B2 are disposed on an outer periphery part of the carrier 22C. Although the carrier 22C is not illustrated on the inner periphery of the multiple disc clutch 52 of the second clutch C2 in FIG. 4, the carrier 22C is arranged in another phase in a circumferential direction. In other words, the inner periphery of the multiple disc brake 85 is provided with at least one planetary gear mechanism. In this embodiment, the inner periphery of the multiple disc brake 85 is provided with two planetary gear mechanisms: the second planetary gear mechanism 23 and the third planetary gear mechanism 25. The second ring gear 23R shared by the second planetary gear mechanism 23 and the third planetary gear mechanism 25 has an annular shape, and the inner periphery thereof is spline-fitted in the output gear 24 serving as a transmission output shaft.

On the side close to the torque converter 12 in the axial direction RC, an outer peripheral surface of the third sun gear 25S is provided with spline teeth 91. Furthermore, an inner peripheral surface of the clutch drum 41 is provided with spline teeth 92 at a portion overlapped with the spline teeth 91 of the third sun gear 25S when the clutch drum 41 is viewed from a radial direction. The spline teeth 91 of the third sun gear 25S and the spline teeth 92 of the clutch drum 41 are spline-fitted. This arrangement forms a spline fit unit 93 which makes the third sun gear 25S and the clutch drum 41 connected and which does not allow the third sun gear 25S and the clutch drum 41 to rotate relatively, while allowing relative rotation of a backlash, but allows those members to move relatively in the axial direction RC. A tolerance ring 94 is disposed in contact with both the third sun gear 25S and the clutch drum 41, being adjacent in the axial direction RC to a position where the spline teeth 91 and 92 included in the spline fit unit 93 mesh with each other, that is, a part which is different from the spline fit unit 93 and where the third sun gear 25S and the clutch drum 41 are overlapped with each other when viewed from the radial direction. The inner peripheral surface of the clutch drum 41 is provided with an annular groove 95. This annular groove 95 forms an annular space where the tolerance ring 94 is disposed.

The first clutch C1 to the fourth clutch C4 each employs a multiple disc clutch or a wet frictional engagement element. When a multiple disc clutch is engaged, a pressing force is applied to the multiple disc clutch in the axial direction RC, causing a frictional force that transmits power. A multiple disc clutch is of wet type, and a multiple disc clutch is cooled and lubricated by lubricating oil supplied or charged in the casing 14. The first brake B1 and the second brake B2 each employ a multiple disc brake or a wet frictional engagement element. When a multiple disc brake is engaged, a pressing force is applied to the multiple disc brake in the axial direction RC, causing a frictional force that generates a braking force. A multiple disc brake is of wet type, and a multiple disc brake is cooled and lubricated by a lubricating oil supplied or charged in the casing 14.

The first clutch C1 includes the clutch drum 41, the multiple disc clutch 42 or a frictional engagement element, a piston 43, a spring 44, and a hydraulic chamber 45. The multiple disc clutch 42 is disposed between the clutch drum 41 and the first ring gear 21R. The piston 43 presses the multiple disc clutch 42. The spring 44 urges the piston 43 in a direction away from the multiple disc clutch 42 along the direction of the axial line (Rotation Center) RC. The hydraulic chamber 45 is an oil-tight space which is formed by being surrounded by the piston 43 and the clutch drum 41 and to which a hydraulic oil is supplied from the hydraulic control circuit 4.

The clutch drum 41 includes a cylindrical member provided with the small-diameter portion 41a and a large-diameter portion 41b, being arranged about the axial line RC in a rotatable manner. The multiple disc clutch 42 including a plurality of friction plates is disposed between an inner peripheral surface of the large-diameter portion 41b of the clutch drum 41 and an outer peripheral surface of the first ring gear 21R. The piston 43 is provided with a pressing portion at a position adjacent to the multiple disc clutch 42 along the direction of the axial line RC. Moving toward the multiple disc clutch 42 along the direction of the axial line RC, the piston 43 presses the multiple disc clutch 42 and causes the first clutch C1 to be engaged or partially engaged (to be engaged in a slipping manner). The engagement of the first clutch C1 connects the clutch drum 41 and the first ring gear 21R. The piston 43 is controlled by the hydraulic pressure supplied to the hydraulic chamber 45.

The second clutch C2 includes a clutch drum 51, the multiple disc clutch 52 or a frictional engagement element, a piston 53, a spring 54, and a hydraulic chamber 55. The multiple disc clutch 52 is disposed between the clutch drum 51 and the carrier 22C. The piston 53 presses the multiple disc clutch 52. The spring 54 urges the piston 53 in a direction away from the multiple disc clutch 52 along the direction of the axial line RC. The hydraulic chamber 55 is an oil-tight space which is formed by being surrounded by the piston 53 and the clutch drum 51 and to which a hydraulic oil is supplied from the hydraulic control circuit 4.

The clutch drum 51 is a cylindrical member having a bottom, being arranged about the axial line RC in a rotatable manner. The multiple disc clutch 52 includes a plurality of friction plates and is disposed between an inner peripheral surface of the clutch drum 51 and an outer peripheral surface of the carrier 22C. The piston 53 is provided with a pressing portion at a position adjacent to the multiple disc clutch 52 along the direction of the axial line RC. Moving toward the multiple disc clutch 52 along the direction of the axial line RC, the piston 53 presses the multiple disc clutch 52 and causes the second clutch C2 to be engaged or partially engaged. The engagement of the second clutch C2 connects the clutch drum 51 and the carrier 22C. The piston 53 is controlled by the hydraulic pressure supplied to the hydraulic chamber 55.

The third clutch C3 includes a clutch drum 61, the multiple disc clutch 62 or a frictional engagement element, a piston 63, a hydraulic chamber 64, and a spring (not illustrated). The multiple disc clutch 62 is disposed between an outer peripheral surface of the first ring gear 21R and an inner peripheral surface of the clutch drum 61. The piston 63 is presses the multiple disc clutch 62. A spring (not illustrated) urges the piston 63 away from the multiple disc clutch 62 along the direction of the axial line RC. The hydraulic chamber 64 is an oil-tight space which is formed by being surrounded by the piston 63 and the clutch drum 61 and to which a hydraulic oil is supplied from the hydraulic control circuit 4.

The clutch drum 61 is a cylindrical member having a bottom, being arranged about the axial line RC in a rotatable manner. The multiple disc clutch 62 includes a plurality of friction plates, being disposed between an inner peripheral surface of a cylindrical portion of the clutch drum 61 and the outer peripheral surface of the first ring gear 21R. The piston 63 is provided with a pressing portion at a position adjacent to the multiple disc clutch 62 along the direction of the axial line RC. Moving toward the multiple disc clutch 62 along the direction of the axial line RC, the piston 63 presses the multiple disc clutch 62 and causes the third clutch C3 to be engaged or partially engaged. The engagement of the third clutch C3 connects the clutch drum 61 and the first ring gear 21R. The piston 63 is controlled by the hydraulic pressure supplied to the hydraulic chamber 64.

The fourth clutch C4 includes a clutch drum 71, a multiple disc clutch 72 or a frictional engagement element, a piston 73, a hydraulic chamber 74, and a spring (not illustrated). The multiple disc clutch 72 is disposed between the clutch drum 71 and the carrier 21C. The piston 73 presses the multiple disc clutch 72. A spring (not illustrated) urges the piston 73 in a direction away from the multiple disc clutch 72 along the direction of the axial line RC. The hydraulic chamber 74 is an oil-tight space which is formed by being surrounded by the piston 73 and the clutch drum 71 and to which a hydraulic oil is supplied from the hydraulic control circuit 4.

The clutch drum 71 is a double cylindrical member having a bottom, being arranged about the axial line RC in a rotatable manner. The multiple disc clutch 72 includes a plurality of friction plates, being disposed between a cylindrical portion on the outer periphery of the clutch drum 71 and a cylindrical member 75 connected to the carrier 21C. The piston 73 is provided with a pressing portion at a position adjacent to the multiple disc clutch 72 along the direction of the axial line RC. Moving toward the multiple disc clutch 72 along the direction of the axial line RC, the piston 73 presses the multiple disc clutch 72 and causes the fourth clutch C4 to be engaged or partly engaged. The engagement of the fourth clutch C4 connects the carrier 21C and the clutch drum 71. The piston 73 is controlled by the hydraulic pressure supplied to the hydraulic chamber 74.

The first brake B1 includes the connection drum 81, a multiple disc brake 82 or a frictional engagement element, a piston 83, a hydraulic chamber 84, and a spring (not illustrated). The connection drum 81 is connected to the clutch drum 61. The multiple disc brake 82 is disposed between the casing 14 and the connection drum 81. The piston 83 presses the multiple disc brake 82. A spring (not illustrated) urges the piston 83 in a direction away from the multiple disc brake 82 along the direction of the axial line RC. The hydraulic chamber 84 is an oil-tight space which is formed by being surrounded by the casing 14 and the piston 83 and to which hydraulic oil is supplied from the hydraulic control circuit 4.

The connection drum 81 includes a cylindrical member provided with the small-diameter portion 81a and the large-diameter portion 81b, being arranged about the axial line RC in a rotatable manner. The multiple disc brake 82 includes a plurality of friction plates and is disposed between an outer peripheral surface of the large-diameter portion 81b of the connection drum 81 and an inner wall of the casing 14. The piston 83 is provided with a pressing portion at a position adjacent to the multiple disc brake 82 in the axial direction RC. Moving toward the multiple disc brake 82 along the direction of the axial line RC, the piston 83 presses the multiple disc brake 82 and causes the first brake B1 to be engaged or partially engaged. The engagement of the first brake B1 connects the connection drum 81 and the casing 14 and stops the rotation of the connection drum 81. The piston 83 is controlled by the hydraulic pressure supplied to the hydraulic chamber 84.

The second brake B2 includes the multiple disc brake 85 or a frictional engagement element, a piston 86, a hydraulic chamber 87, and a spring (not illustrated). The multiple disc brake 85 is disposed between the outer peripheral surface of the carrier 22C and the inner wall of the casing 14. The piston 86 as a pressing member presses the multiple disc brake 85. A spring (not illustrated) urges the piston 86 in a direction away from the multiple disc brake 85 along the direction of the axial line RC. The hydraulic chamber 87 is an oil-tight space which is formed by being surrounded by the piston 86 and the casing 14 and to which hydraulic oil is supplied from the hydraulic control circuit 4.

The multiple disc brake 85 is provided with brake plates 85b or a plurality of annular first friction plates, and brake discs 85a or a plurality of annular second friction plates. The brake plates 85b and the brake discs 85a are alternately superposed on one another in the axial direction RC. The plurality of brake plates 85b is engaged with spline teeth 141, that is, first spline teeth disposed on the inner wall of the casing 14. The plurality of brake discs 85a is engaged with spline teeth 221, that is, second spline teeth disposed on the outer peripheral surface of the carrier 22C. Furthermore, the multiple disc brake 85 is restricted by a snap ring 88 from moving toward the side of the torque converter 12 in the axial direction RC.

The piston 86 includes an extended portion 86c extended in the axial direction RC and a pressing portion 86a disposed at an end of the extended portion 86c in the axial direction RC on the side close to the multiple disc brake 85. The pressing portion 86a is disposed at a position adjacent to the multiple disc brake 85 in the axial direction RC. A part of the pressing portion 86a protrudes outward in a radial direction of the multiple disc brake 85 from the extended portion 86c. When the piston 86 moves toward the multiple disc brake 85 along the direction of the axial line RC, the pressing portion 86a presses the multiple disc brake 85 and causes the brake disc 85a to be engaged with the brake plate 85b by friction. Accordingly, the second brake B2 is engaged or partially engaged. The engagement of the second brake B2 connects the carrier 22C and the casing 14 and stops the rotation of the carrier 22C. The pressing of the piston 86 with respect to the multiple disc brake 85 is controlled by the hydraulic pressure supplied to the hydraulic chamber 87. On the other hand, the urge of the spring moves the piston 86 in the direction away from the multiple disc brake 85 along the axial direction RC and releases the pressing of the piston 86 with respect to the multiple disc brake 85. Accordingly, the frictional engagement between the brake disc 85a and the brake plate 85b is released. In other words, disengagement of the multiple disc brake 85 makes the second brake B2 disengaged. When the second brake B2 is disengaged, the connection between the carrier 22C and the casing 14 is released, which allows the rotation of the carrier 22C.

Figure 5:
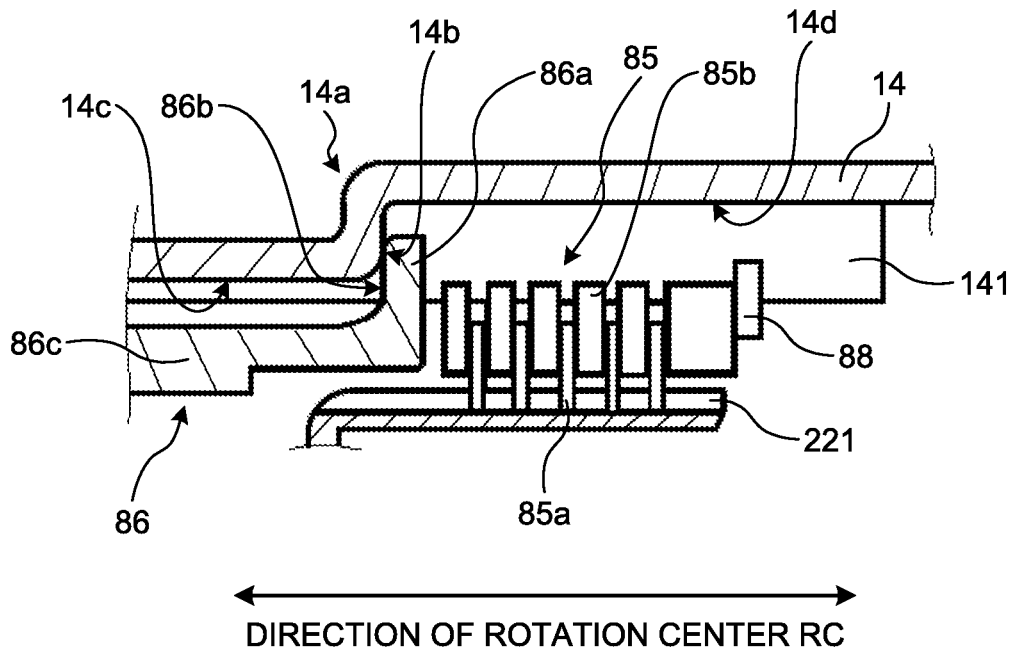
FIG. 5 illustrates the main part of a second brake in a disengaged state.
Figure 6:
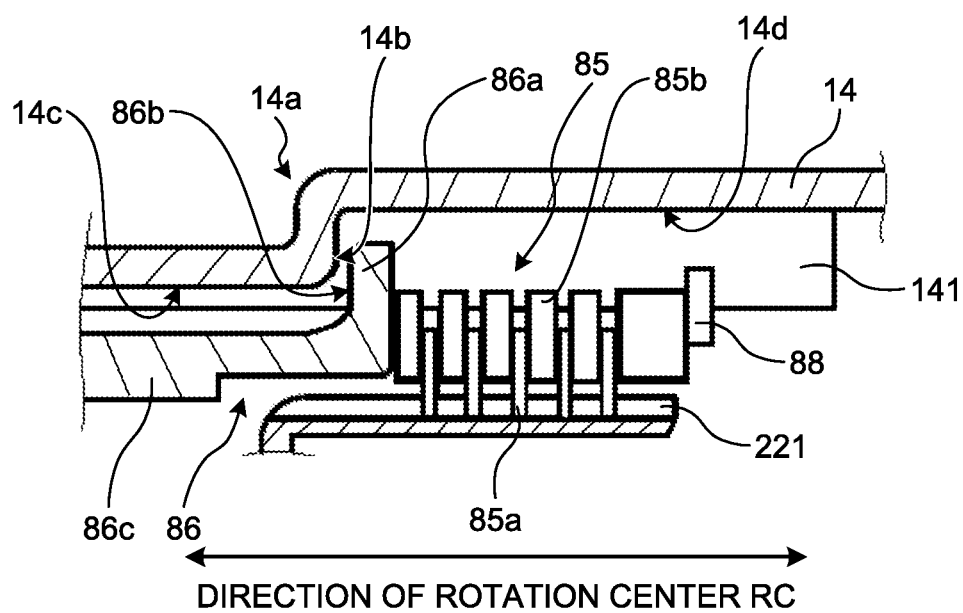
FIG. 6 illustrates a part of the second brake in an engaged state.
Figure 7:
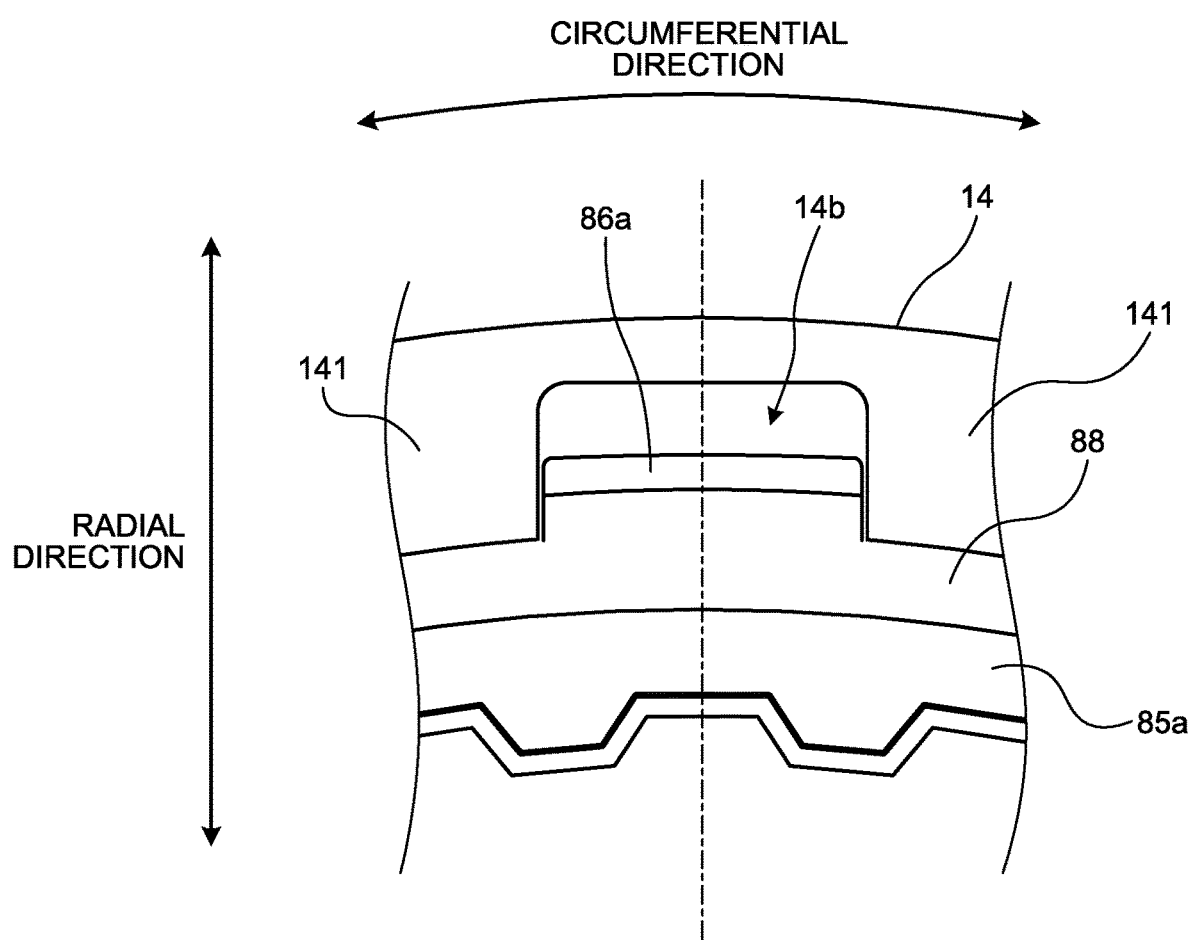
FIG. 7 illustrates a key part of the second brake viewed from a multiple disc brake side in am axial direction.

FIG. 5 illustrates a main part of the second brake B2 being disengaged. FIG. 6 illustrates the main part of the second brake B2 being engaged. FIG. 7 illustrates a main part of the second brake B2 viewed from the multiple disc brake 85 in the axial direction RC.

As illustrated in FIG. 5, in a range of motion of the piston 86 in the axial direction RC, when the piston 86 is placed at a position farthest from the multiple disc brake 85, and when the second brake B2 is disengaged, a back surface 86b in the pressing portion 86a of the piston 86 comes into contact with a contact portion 14b disposed on an inner wall of a bent portion 14a of the casing 14. The back surface 86b of the piston 86 faces the contact portion 14b in the part of the pressing portion 86a. The bent portion 14a is formed as the casing 14 is bent in the radial direction of the multiple disc brake 85, and the contact portion 14b is disposed on the inner wall of the bent portion 14a.

On the other hand, as illustrated in FIG. 6, when the pressing portion 86a presses the multiple disc brake 85, and when the second brake B2 is engaged or partially engaged, the back surface 86b in the pressing portion 86a of the piston 86 and the contact portion 14b of the casing 14 are separated from each other.

As illustrated in FIG. 7, the pressing portion 86a of the piston 86 is disposed between adjacent spline teeth 141 among a plurality of spline teeth 141 that is disposed at intervals on the inner wall of the casing 14 in a circumferential direction of the multiple disc brake 85. In the circumferential direction of the multiple disc brake 85, the pressing portion 86a of the piston 86 has a width substantially equal to a distance between adjacent spline teeth 141. Furthermore, in the radial direction of the multiple disc brake 85, a gap is formed between the pressing portion 86a of the piston 86 and a portion of an inner wall 14d of the casing 14, the portion being between the adjacent spline teeth 141.

As illustrated in FIG. 6, when the second brake B2 is engaged or partially engaged, a gap is formed between the back surface 86b in the pressing portion 86a of the piston 86 and the contact portion 14b of the casing 14. Accordingly, a lubricating oil is supplied to the multiple disc brake 85 along an inner wall 14c of the casing 14 and the inner wall 14d of the contact portion 14b between the spline teeth 141 in which the pressing portion 86a of the piston 86 is fitted.

On the other hand, as illustrated in FIG. 5, when the second brake B2 is disengaged, a contact between the back surface 86b of the piston 86 and the contact portion 14b of the casing 14 closes the gap between the back surface 86b and the contact portion 14b which is formed when the second brake B2 is engaged. Accordingly, between the adjacent spline teeth 141 in which the piston 86 is fitted, most of the lubricating oil flowing toward the multiple disc brake 85 along the inner wall 14c of the casing 14 is blocked by the back surface 86b of the piston 86 and the contact portion 14b of the casing 14. Between the pressing portion 86a of the piston 86 and adjacent spline teeth 141 in the circumferential direction of the multiple disc brake 85, a small gap may be formed because of a slight backlash. Therefore, some lubricating oil may flow from the inner wall 14c of the casing 14 toward the inner wall 14d through this small gap. However, at this time, an amount of lubricating oil flowing from the inner wall 14c of the casing 14 toward the inner wall 14d is extremely smaller, as compared with a case where a gap is formed between the back surface 86b and the contact portion 14b when the second brake B2 is engaged. Accordingly, when the second brake B2 is disengaged, it is possible to reduce the lubricating oil supplied to the multiple disc brake 85 along the inner wall 14d of the casing 14. This arrangement prevents, when the second brake B2 is disengaged, a large amount of lubricating oil from being supplied to the multiple disc brake 85 and prevents a drag loss from being increased.

Figure 8:
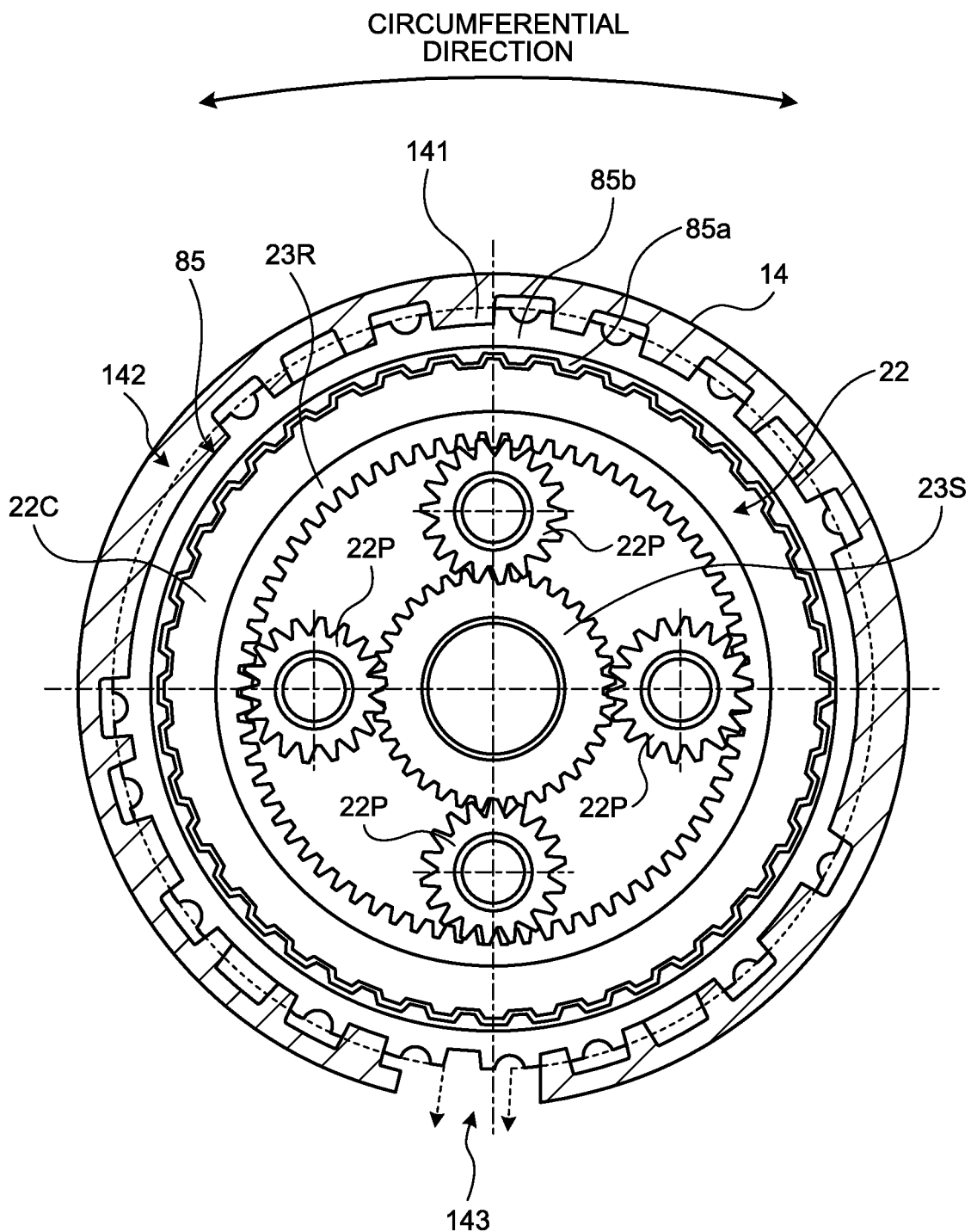
FIG. 8 is a cross-sectional view of a second gearshift unit sectioned in a direction orthogonal to the axial direction at a position of a slit disposed in a casing.

Furthermore, in the automatic transmission 2 according to an embodiment, as illustrated in FIGS. 4 and 8, each of the plurality of spline teeth 141 disposed on the inner wall of the casing 14 is provided with a slit 142, a groove that penetrates the multiple disc brake 85 in the circumferential direction, at a position deeper than the bent portion 14a in the axial direction RC in the side opposite to the side of the multiple disc brake 85. Accordingly, when the second brake B2 is disengaged, a contact between the back surface 86b and the contact portion 14b prevents the lubricating oil from being flown toward the multiple disc brake 85 along the inner wall 14c of the casing 14, which causes a partial flow of the lubricating oil into the slit 142, the lubricating oil being accumulated between the adjacent spline teeth 141 in which the piston 86 is to be fitted. The lubricating oil flowing into the slit 142 flows inside the slit 142 in the circumferential direction and is discharged from a discharge port 143 disposed in a lower part of the casing 14 that covers the second gearshift unit 22. This makes it possible to use the lubricating oil in other places inside the casing 14.

An automatic transmission according to an embodiment of the present disclosure exhibits an effect of reducing lubricating oil to be supplied to the frictional engagement element along the inner wall of the transmission case when the back surface of the pressing member comes into contact with the contact portion disposed on the inner wall of the transmission case while the frictional engagement element is disengaged.

According to an embodiment, when the frictional engagement element is disengaged, and when the back surface of the pressing member comes into contact with the contact portion of the transmission case, it is possible to discharge, from the groove, a part of lubricating oil accumulated between adjacent first splines in which the pressing member is fitted.

According to an embodiment, when the frictional engagement element is disengaged at the position, in the range of motion of the pressing member in the direction of the rotation center, where the pressing member is farthest from the frictional engagement element, it is possible to bring the back surface of the pressing member into contact with the contact portion of the transmission case.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An automatic transmission comprising:
   a transmission case;
   a rotating member;
   a frictional engagement element which includes
      a plurality of first annular friction plates, which are formed in an annular shape and are engaged with first spline teeth formed on an inner wall of the transmission case, and
      a plurality of second annular friction plates, which are formed in an annular shape and are engaged with second spline teeth formed on an outer peripheral surface of the rotating member, the first friction plates and the second friction plate being alternately superposed on one another in an axial direction of the rotating member;
   a pressing member configured to move back and forth in the axial direction relative to the transmission case and press the frictional engagement element in the axial direction; and
   a lubricating oil which lubricates the frictional engagement element, wherein:
      the frictional engagement element, the pressing member, and the lubricating oil are housed in the transmission case,
      the frictional engagement element is in an engagement state when the pressing member presses the frictional engagement element and the frictional engagement element is in a disengagement state when the pressing by the pressing member to the frictional engagement element is released,
      the transmission case includes a contact portion on the inner wall so that the contact portion is separated from a back surface of the pressing member when the frictional engagement element is in the engagement state and comes into contact with the back surface of the pressing member when the frictional engagement element is in the disengagement state,
      the pressing member includes an extended portion, which extends in the axial direction, and a pressing portion, which is disposed at an end of the extended portion on a side close to the frictional engagement element in the axial direction, the pressing portion protruding outward from the extended portion only in a radial direction of the frictional engagement element, the contact portion is disposed on a side opposite to a side of the frictional engagement element with respect to the pressing member in the axial direction and is formed on an inner wall of the transmission case, the inner wall extending in the radial direction in a bending portion which is bent outward, the back surface of the pressing member faces the contact portion in the part of the pressing portion, a first surface of the pressing portion contacts the frictional engagement element in the engagement state and a second surface of the pressing portion opposite to the first surface of the pressing portion contacts the contact portion in the disengagement state, the first spline teeth are formed in plural on the inner wall at an interval in a circumferential direction of the frictional engagement element, the pressing member is configured to move back and forth in the axial direction to be engaged between the first spline teeth adjacent to each other in the circumferential direction, and the transmission case includes a groove, which is formed on a side opposite to a side where the frictional engagement element is disposed with respect to the contact portion and penetrates in the circumferential direction.

2. An automatic transmission comprising:
a transmission case;
a rotating member;
a frictional engagement element which includes
a plurality of first annular friction plates, which are formed in an annular shape and are engaged with first spline teeth formed on an inner wall of the transmission case, and
a plurality of second annular friction plates, which are formed in an annular shape and are engaged with second spline teeth formed on an outer peripheral surface of the rotating member, the first friction plates and the second friction plate being alternately superposed on one another in an axial direction of the rotating member;

a pressing member configured to move back and forth in the axial direction relative to the transmission case and press the frictional engagement element in the axial direction; and a lubricating oil which lubricates the frictional engagement element, wherein:
the frictional engagement element, the pressing member, and the lubricating oil are housed in the transmission case, the frictional engagement element is in an engagement state when the pressing member presses the frictional engagement element and the frictional engagement element is in a disengagement state when the pressing by the pressing member to the frictional engagement element is released, the transmission case includes a contact portion on the inner wall so that the contact portion is separated from a back surface of the pressing member when the frictional engagement element is in the engagement state and comes into contact with the back surface of the pressing member when the frictional engagement element is in the disengagement state, the pressing member includes an extended portion, which extends in the axial direction, and a pressing portion, which is disposed at an end of the extended portion on a side close to the frictional engagement element in the axial direction, the pressing portion protruding outward from the extended portion only in a radial direction of the frictional engagement element, the contact portion is disposed on a side opposite to a side of the frictional engagement element with respect to the pressing member in the axial direction and is formed on an inner wall of the transmission case, the inner wall extending in the radial direction in a bending portion which is bent outward, the back surface of the pressing member faces the contact portion in the part of the pressing portion, a first surface of the pressing portion contacts the frictional engagement element in the engagement state and a second surface of the pressing portion opposite to the first surface of the pressing portion contacts the contact portion in the disengagement state, and the pressing member closes a lubricant flow passage in the disengagement state and opens the lubricant flow passage in the engagement state.

* * * * *